United States Patent [19]
Erickson

[11] 3,768,911
[45] Oct. 30, 1973

[54] ELECTRO-OPTICAL INCREMENTAL MOTION AND POSITION INDICATOR

[75] Inventor: Kent E. Erickson, Brookside, N.J.

[73] Assignee: Keuffel & Esser Company, Morristown, N.J.

[22] Filed: Aug. 17, 1971

[21] Appl. No.: 172,383

[52] U.S. Cl.......... 356/169, 235/92 GC, 250/237 G
[51] Int. Cl....... G01b 11/04, G06f 7/38, G06g 7/00
[58] Field of Search................... 250/237 G, 237 R; 235/92 GC; 356/169

[56] References Cited
UNITED STATES PATENTS
2,993,279  7/1961  Bower................................ 356/169

OTHER PUBLICATIONS
"The Possibilities of Moire Fringe Interferometry" in Interferometry, J. M. Burch, Her Majesty's Stationery Office, London 1960, QC, 411, T4 Title Page and pages 181, 198, 199, and 200.

Primary Examiner—James W. Lawrence
Assistant Examiner—T. N. Grigsby
Attorney—J. Russell Juten et al.

[57] ABSTRACT

A compact electro-optical system provides electrical signals for indicating extent and direction of incremental movement. By employing a plurality of moire fringe-generating grating pairs in optical series, the system eliminates the need for a collimated light source or imaging optics, and further provides a multiplication of sensitivity.

17 Claims, 16 Drawing Figures

Patented Oct. 30, 1973
3,768,911
3 Sheets-Sheet 1
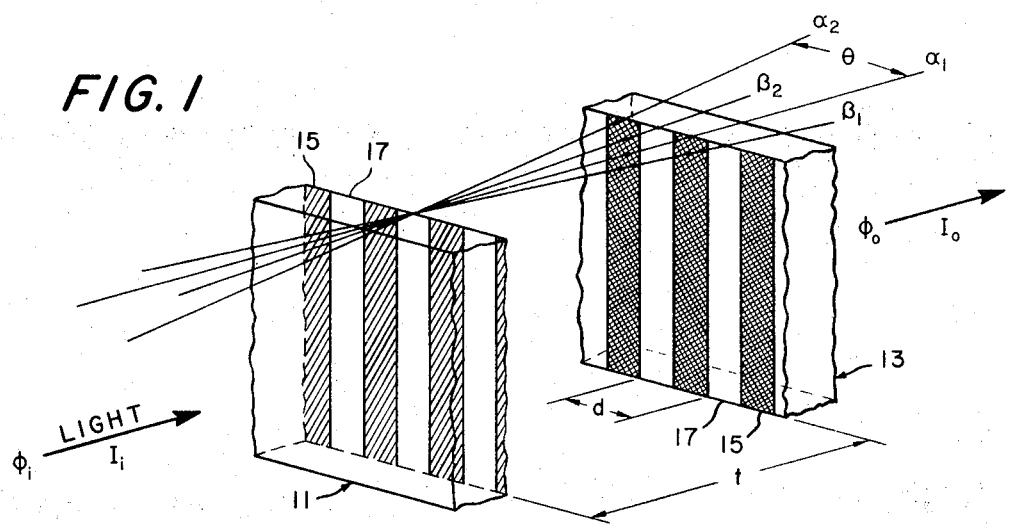
FIG. 1
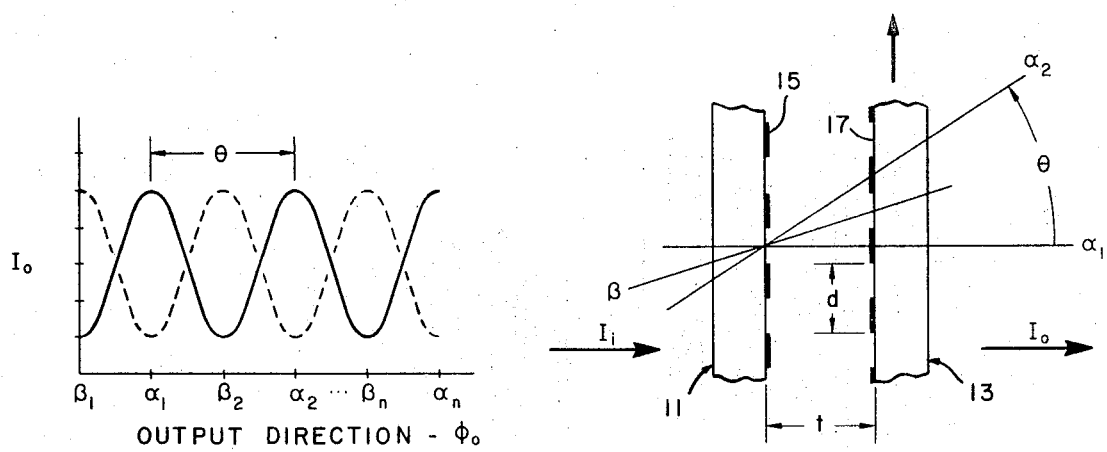
FIG. 2
FIG. 3
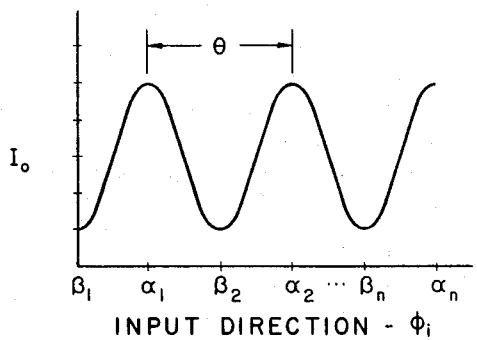
FIG. 4
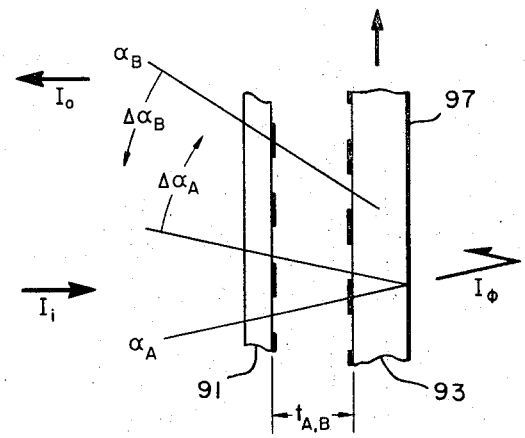
FIG. 9

Patented Oct. 30, 1973 3,768,911

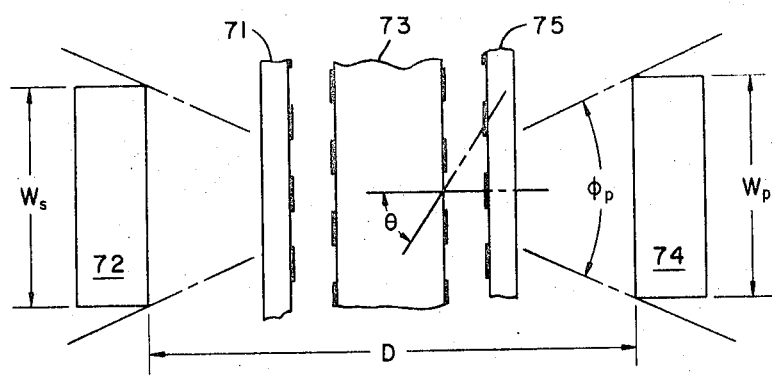
FIG.10
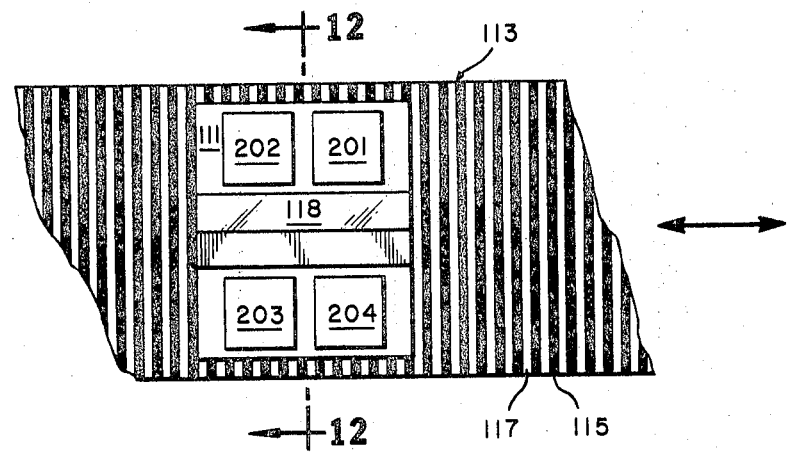
FIG.11
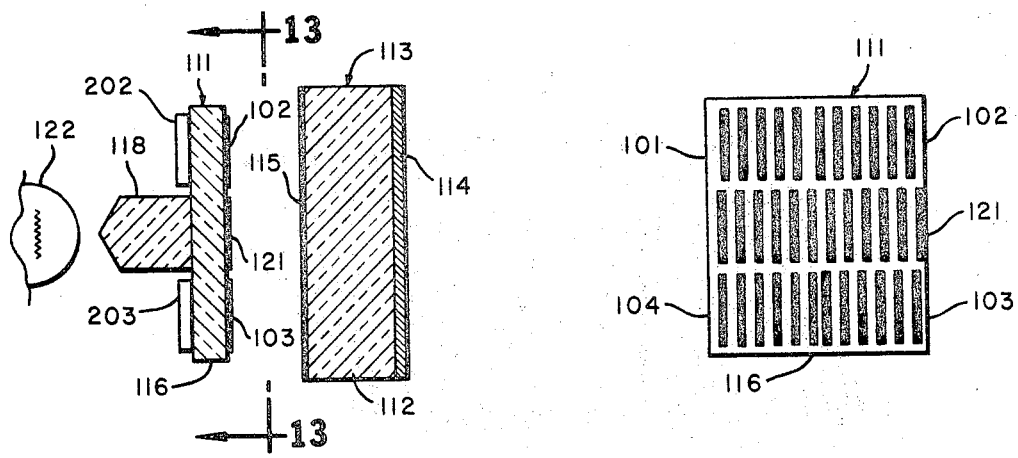
FIG.12
FIG.13

ELECTRO-OPTICAL INCREMENTAL MOTION AND POSITION INDICATOR

BACKGROUND OF THE INVENTION

Electro-optical systems for indicating minute linear or angular displacement have for some time made use of the moire fringe pattern generated by a pair of gratings disposed in a light beam. In many such systems amplitude gratings have been used wherein each grating in the pair comprises alternating opaque and transparent areas, usually in the form of regularly disposed parallel or radial lines or rulings. These systems operate in principal upon the fact that relative movement between the gratings in a direction transverse to the rulings results in a change in the directions of light output from the grating pair. The latter directional change can be visually observed as a transverse shift in moire fringe position and when appropriate optics are employed in the light entering or emerging from the grating pair the change in light output directions can be translated into a generally cyclic fluctuation in the intensity of light transmitted by the pair. Photoelectric means are commonly used to convert the varying light intensity to a comparably varying electrical signal which is employed to trigger electronic counting means in order to indicate the amount of relative movement between the grating pair elements.

Since the directional perturbations caused by relative movement between a pair of gratings are indistinguishable by a photocell, it is necessary to employ optical means to derive moire fringes which vary positionally with such relative grating movement. Such optics are selected so as to provide, in conjunction with the desired dimensions of the grating pair, a pattern of moire fringes whose relative position may be readily distinguished by a photocell, normally as a variation in light intensity.

Previous systems have employed collimating optics in the input light beam so as to limit the direction of the input light and form a fringe pattern at the face of the photocell which has a period of repeated cycle greatly exceeding the finite field of view of the photocell, thereby causing a light intensity fluctuation at the photocell as a function of the positional change in the fringe pattern.

Alternatively, other known systems have employed optics in the output from a grating pair to form a fringe pattern varying in position with relative grating movement and have additionally employed an aperture to limit the photocell viewing field to a narrow region of the fringe pattern in order to obtain the light intensity fluctuation with the positional change of the fringe pattern.

In addition to a loss of useful light, these prior devices suffered from the disadvantages occasioned by the size and cost requirements of the incorporated optical elements. Further limitations inherent in previous systems resulted from the direct relationship between the period of the grating element pattern and the period of the fringe pattern formed at the photocell, i.e., the relative movement between grating elements of one grating period resulting in a single cycle displacement of the fringe pattern. In order to increase the sensitivity of these systems it was therefore required to provide a greater frequency of rulings with resulting inordinate expense of grating manufacture. An additional and more limiting consideration, however, was based upon the fact that the spacing between a pair of gratings must be reduced as the square of the grating period in order to retain an effective visibility in the fringes. The necessity of allowing unhindered movement between the grating pair elements thus severely restricted the reduction in grating periodicity.

In order to avoid this grating element spacing restriction, systems were devised wherein the grating pattern of one element was imaged upon a second element, thereby in effect eliminating the spacing between grating elements and allowing a greater reduction in grating periodicity with resulting system sensitivity. However, such systems, as described, for example, in U.S. Pat. Nos. 3,244,895 and 3,454,777 represent a compromise of compact design by the introduction of additional imaging optics which compound space requirements and costs.

The utilization of light signals obtained in prior art systems generally has included the use of photoelectric cells to convert the light to electrical signals. Such electrical signals are employed in either differential or push-pull common-mode-eliminating amplification systems in conjunction with electronic counters and display devices. It has been common practice to use phase displacement between signal pairs as a means for eliminating common D. C. signal components as well as to obtain sine-cosine signal sets upon which to base motion direction discrimination. Such procedures and related equipment are discussed by Burch (*Progress in Optics*, Vol. II, Part II, sec. 3.2, pp. 100–102, Interscience Publishers, 1963), and various systems are described in U.S. Pat. Nos. 3,244,895; 3,454,777, 3,482,107; 3,483,389; 3,502,414; 3,538,339 and 3,573,468.

SUMMARY OF THE INVENTION

The present invention provides an electro-optical system for determining incremental motion and position change. The system is generally of the moire fringe type previously noted, however, it represents an advancement in the relevant art in that it employs a simple, non-collimated light source, yet eliminates the previous need for imaging optics and thereby provides a compact and economical measuring device and apparatus. The invention additionally provides a multiplication of sensitivity and, by utilizing the composite signal of a plurality of fringes, provides a high intensity light signal and eliminates the effect of any localized distortions in the elements of the system.

Whereas previous sytems have provided incremental distance measurement by various means of interpretation of the classic moire fringe pattern generated by a single pair of ruled gratings, the present invention is characterized by the utilization of a plurality of grating pairs arranged in series in the light beam of the system. By such an arrangement the present invention makes practical use of gratings which are sufficiently coarse to be mass-produced by photographic methods, yet provides useful sensitivity by a multiplication of light signal frequency. Unlike earlier systems which relied for signal generation upon the fluctuation of light intensity as a function of the position of individual fringes in a moire pattern, the present invention provides for the generation of a fringe pattern which cyclically varies in intensity as a whole. The resulting intensity fluctuation of the fringe pattern is thus distinguishable by a photocell detector over a substantial number of fringes, thereby providing an increase in useful signal as well as obtaining an averaging which eliminates extraneous single-fringe errors.

The grating pairs employed in the present invention are amplitude gratings which are constructed in the usual manner to provide optimum fringe visibility, that is, each grid element of a pair consists of a stable transparent plate having on one surface a set of parallel opaque rulings of a given width, each ruling being separated from the next by a clear transparent space of substantially equal width, thus forming a grid pattern of repeated period, $d$. It will, of course, be understood that gratings bearing radial rulings are to be employed in systems intended for angular measurement; however, the present discussions will be limited to linear measuring devices in view of the equivalence between the two types of systems.

Each of the grating pairs in the present invention comprises two similar grid elements arranged in parallel planes with their respective rulings substantially parallel and the elements separated by a space, $t$, established by the relationship: $t=d^2/\lambda$, where $\lambda$ is the effective wavelength of the light beam of the system. The wavelength factor will usually vary within a limited range due to the light source selected and the response band of the photocell used; therefore, while the spacing, $t$, can be generally calculated, final assembly adjustment is normally effected to obtain optimum signal.

When a field of uniform illumination is viewed through one such grid pair arrangement, a typical moire fringe pattern can be seen and is disposed with the fringe bands running substantially parallel to the grid rulings. The fringe pattern appears to be located at infinity, the apparent result of the cumulative interference between the adjacent major diffraction orders of light entering the grid pair from the infinitely numerous directions represented by the uniform field, and the positions of the individual bands of the fringe pattern are located according to the relative alignment of the rulings of the respective grid elements. Relative movement between the grid elements in a direction transverse to the rulings appears as a similar transverse shift in the positions of the fringe bands; however, the relative light intensities of the bands remain constant.

While the change in direction of light output from the grid pair can be observed visually as a transverse shift in fringe pattern position, a photocell viewing a multiplicity of fringes cannot distinguish the change in direction of light incidence and as a result merely generates a signal representative of the sum of the intensities of all light incident upon its face, regardless of the direction of light output from the grating pair. Such is the reason that prior systems required optical means to limit the relative width of the photocell viewing field to a portion only of one fringe pattern cycle to allow the photocell to "see" a fluctuation in light intensity and provide a means for counting the number of fringes moving past the photocell station.

As a basis for considering the operation of the present invention it can generally be stated that a pair of amplitude gratings of the type described can be viewed as having a series of inherent directional preferences with respect to the transmission of a light beam in which the pair is situated. These directional preferences depend primarily upon the relative positions of the respective grid patterns of each element of the pair and change periodically with relative movement between the grid patterns, that is to say, the relative displacement of one period, $d$, between grating elements results in a shift in directional preferences through one cycle, the angular magnitude of one such directional preference cycle, $\theta = \tan^{-1} d/t$. The directional preferences of the grating pair may be further defined as comprising a sub-series of major, or "preferred," directions varying in azimuth by $\theta$, and a second sub-series of minor, or "non-preferred," directions bisecting the preferred directions.

The directional preference phenomenon of a grating pair manifests itself in two basic ways which may be related to the type of input light incident upon the pair. First, if the grating pair is positioned in a beam of unidirectional, collimated light, the intensity of output light from the pair will appear as a function of the relative alignment of that input direction with the directional preferences of the pair; specifically, the output intensity being maximum when the input direction is the same as a preferred direction of the grating pair, and minimum when the input is aligned with a non-preferred direction.

Secondly, if the grating pair is situated in a uniform omnidirectional light beam, the intensity of output light emerging from the pair in any given direction will appear as a function of the alignment of that output direction with the directional preferences of the pair; specifically, the output light being a maximum in the preferred directions of the grating pair while being a minimum in the non-preferred directions.

Relative movement between the elements of a grating pair will result, as noted, in a shift in the directional preferences of the pair and, depending upon which of the two described light input situations exists, will further result in either (1) a change in output light intensity or (2) a change in the directions of output of maximum and minimum light intensity. In either situation the noted change follows the relative movement between grating elements and varies through one cycle with each relative displacement of grid period, $d$, between the elements of the pair.

The present invention utilizes the directional preferences of grating pairs in a measuring system by arranging, in optical series, a uniform field of illumination, i.e., a source of omnidirectional light input, such as a simple incandescent lamp; two pairs of amplitude gratings situated in substantially parallel planes; and a photoelectric cell. These elements represent the most simple basics of the system, since, as will be later discussed, a preferred system comprises a plurality of grating patterns and photocells to obtain comparative electrical signals useful in electronic counters; however, the operation of the present system may be sufficiently considered in terms of the listed elements.

As generally described above, the first pair of gratings, i.e., that pair upon which the input light is incident, if in fixed relationship, establishes a fixed set of preferred, i.e., maximum intensity, and non-preferred, i.e., minimum intensity, light output directions. These directions, conversely, represent sets of light input directions with respect to the second pair of similar gratings which are arranged for relative movement in the general direction to be measured, as by mounting one grid element of the second pair on a slide moveable in a direction transverse to the grid rulings.

The operation of the present system can be generally understood by considering that when the preferred directions of the two grating pairs are aligned, i.e., where preferred output directions of the first pair are the same as preferred input directions of the second, the light maximally "transmitted" through the first pair, i.e., in the preferred output directions, will be further maximally "transmitted" through the second pair. Concurrently, due to the alignment of the non-preferred directions of the two grating pairs, the light minimally transmitted by the first pair in such directions will be further transmitted by the second.

Considering now the displacement of the moveable grid element of the second pair by an increment of $d/2$, one can see that the preferred directions of the second grating pair have been shifted by an increment of $\theta/2$, that is to say, the preferred input directions of the second grating pair are aligned with the non-preferred output dirctions of the first grating pair. As a result of this realignment of directional preferences of the two pairs of gratings, the light maximally transmitted in the preferred directions by the first pair will now be transmitted minimally by the second pair, and vice versa.

Thus it can be seen that the intensity of light transmitted by the combination of two grating pairs is a product function dependent upon the relative dispositions of the directional preferences of each of the two grating pairs. The photocell of the system effectively integrates the directionally-related light intensity products over all directions within its field of view and generates an electrical signal which fluctuates with the displacement between grid elements and the resulting change in alignment of the directional preferences of the two grating pairs.

The present invention can therefore be distinguished from prior single grating pair systems which relied upon a change in moire fringe pattern position in response to incremental grid element displacement, by the fact that the present dual pair arrangement creates a change of light intensity over the whole of the field of view of the photocell with such displacement and eliminates the necessity for means to establish a change in position of a fringe pattern with respect to the photocell.

As will later be noted in greater detail, it is of further advantage to arrange one grid element in each of the two grating pairs for movement with respect to its mate. The respective directions of movement of these elements is selected to provide a countercurrent change in the directional preferences of the respective grating pairs. In this manner the relative rate of change of preferred direction alignments as a function of displacement is doubled and a doubling of the system sensitivity is achieved. A simple method of providing countercurrent change of directional preferences is to fold the light path within the system by reflective means. This practice additionally reduces the number of physical elements required and yields a "one-sided" system, i.e., where light source and photocells are at the same side of the gratings, and provides for ready access for cleaning, adjustment, or repair.

The prior art is familiar with various electronic arrangements by which photocell-generated electrical signals can be counted and displayed. The capability of the present invention to produce a plurality of related phase-displaced light signals renders it particularly useful in conjunction with counters described in the earlier-referenced publications. For example, by regularly displacing separate regions of one grid element pattern in quadrature, there will result separate regions of the output light beam in which intensities may be varied cyclically, but in quadrature displacement. Photoelectric cells individually associated with each such region of the output light beam will provide signals similarly displaced according to phase quadrature, and such signals may be employed in pairs in common-mode-rejection electronic systems and the resulting pair of signals may be used to obtain sine-cosine signals for distinguishing displacement direction.

THE DRAWINGS

FIG. 1 is a schematic perspective view of a pair of amplitude grating segments employed in the present invention, showing in particular establishment of the characteristic directional preferences of the grating pair;

FIG. 2 is a curve representative of the intensity of light output from a pair of amplitude gratings as a function of output direction;

FIG. 3 is a schematic cross-sectional plan view of the grating pair of FIG. 1 showing in particular the change of directional preferences as a function of grid element displacement;

FIG. 4 is a curve representative of the intensity of light output from a pair of amplitude gratings as a function of input direction;

FIG. 9 is a schematic cross-sectional view of another embodiment of a dual grid pair arrangement according to the present invention;

FIG. 10 is a cross-sectional schematic plan view of one embodiment of an entire light signal generating assembly according to the present invention;

FIG. 11 is a plan view, partially in section, of a preferred embodiment of the present invention;

FIG. 12 is a cross-sectional view of the embodiment of FIG. 11 taken at 12—12;

FIG. 13 is a sectional plan view of FIG. 12, taken at 13—13 showing a preferred reticle grid pattern;

DESCRIPTION OF THE INVENTION

Figure 5:
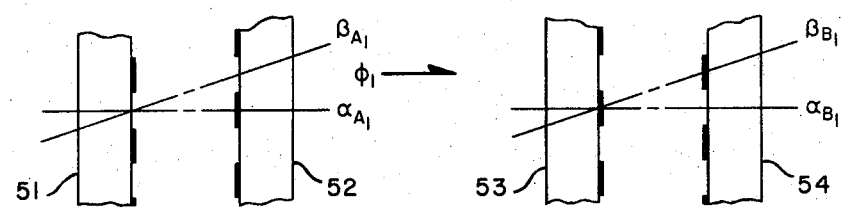
FIG. 5 is a schematic cross-sectional plan view of a combination of two grating pairs according to the present invention, showing in particular, as FIG. 5a and FIG. 5b, a comparison of different alignments of grating pair directional preferences.

The present invention may be described in greater detail by reference to the drawings where, in FIG. 1, there is depicted a segment of a pair of amplitude gratings such as generally employed in this system. Segments of respective first and second grid elements 11, 13 comprise glass plates or other transparent supports of substantial dimensional stability having opaque rulings or bars 15 at their facing surfaces alternating with transparent areas 17. The opaque and transparent areas of the face of the grid elements are of substantially equal width, $d/2$, thereby establishing a recurring grid period of a width, $d$. Grid elements 11, 13 are set in parallel planes separated by a distance, $t=d^2/\lambda$; where λ is the most significant average wave length of the useful input of light having an intensity, $I_i$.

At any given time, i.e., when the elements of a grating pair are in fixed position, sets of directional preferences for the particular pair are established by the relative transverse dispositions of the respective grid patterns of elements 11, 13. In any grating pair of the type described, the preferred directions $\alpha_1, \alpha_2, \ldots \alpha_n$ are those directions which are parallel to the various straight lines lying in a plane perpendicular to grid elements 11, 13 and connecting dissimilar points in the respective grid patterns; for example, in FIG. 1, the lines identifying preferred directions $\alpha_1, \alpha_2$ of the grating pair connect the point at the center of a transparent area 17 on grid element 11 with the points at the centers of opaque areas 15 on grid element 13. Conversely, non-preferred directions $\beta_1, \beta_2, \ldots \beta_n$ are established by like points, i.e., the centers of respective transparent areas 17, on the grid patterns. As indicated, the respective preferred and non-preferred directions of a grating pair vary by an angle, $\theta = \tan^{-1} d/t$, which is the period, or frequency of repetition, of each of the particular directional preferences.

When a pair of amplitude gratings is placed in a beam of omnidirectional light of uniform input intensity $I_i$; the intensity, $I_o$, of light transmitted by the pair will vary according to the alignment between the output direction, $\phi_o$, and the various directional preferences $\alpha, \beta$ of the grating pair. Thus the output intensity, $I_o$, will be a maximum where $\phi_o$ is aligned with a preferred direction, $\alpha$, and will be a minimum where $\phi_o$ is aligned with a non-preferred direction, $\beta$. The solid line curve of FIG. 2 indicates the intensity, $I_o$, of transmitted light as a function of output direction, $\phi_o$, for a grating pair when grid elements 11, 13 are in a first fixed position. As can be seen, a sinusoidally varying output intensity results which has a frequency, $\theta$, established by the directional preference period of the grating pair.

If one grid element 13 is displaced in the arrowed direction indicated in the cross-sectional plan view of the grating pair, FIG. 3, it can be seen that the directional preferences of the pair will be shifted through the period, $\theta$, for each increment, $d$, of such displacement. For a displacement of $d/2$ the relative preferred, $\alpha$, and non-preferred, $\beta$, directions will be shifted by $\theta/2$, and the pattern of intensity of the transmitted light will be located as shown by the dotted line curve of FIG. 2. This positional shift relates to the characteristic visually observed movements of a moire fringe pattern.

It is apparent from FIG. 2 that the overall intensity of the transmitted light, i.e., the intensity over a substantial number, $n$, of periods, $\theta$, as integrated by a photoelectric cell, remains constant. For this reason a photocell is unable to distinguish positional change and incapable of indicating displacement unless field-restricting optics are employed in accordance with prior art practices.

Considering now a second situation where, in FIG. 1, a unidirectional light beam of intensity, $I_i$, is incident upon the grating pair; as by collimation in a given direction, $\phi_i$, it will be apparent that intensity, $I_o$, of the transmitted light will depend upon the alignment between that direction, $\phi_i$, and the directional preferences of the grating pair. Thus, the more nearly $\phi_i$ is aligned with a preferred direction, $\alpha$, of the pair, the greater will be the intensity, $I_o$, of the light transmitted. A continuing change in the input direction, $\phi_i$, will therefore effect output intensity, $I_o$, cyclically in accordance with the period, $\theta$, of the directional preferences of the grating pair. The curve of FIG. 4 represents the output intensity, $I_o$, as a function of input direction, $\phi_i$; and can be seen to be substantially the same as the curve of FIG. 2. Similarly, a change in directional preferences, as by displacement of element 13 (FIG. 3), will effect a sinusoidal variation in output intensity for a given input direction, $\phi_i$. As previously noted, a grid element displacement of one period, $d$, results in an output intensity variation through one cycle, $\theta$.

In view of the foregoing, the effect of the combination of two pairs of gratings arranged in series in an omnidirectional light beam, according to the present invention, may be considered. FIG. 5 generally depicts two positional situations (FIG. 5a and FIG. 5b) of two grating pairs, A, B. In FIG. 5, grating pair A consists of grid elements 51, 52 such as previously described with reference to FIG. 1, and grating pair B consists of elements 53, 54. Elements 51, 52, 54 in the present descriptive representation are fixed, while element 53 is moveable and may be displaced in a manner similar to element 13 in FIG. 3.

The relative positions of the respective grid elements 51, 52 and 53, 54 establish the directional preferences of grating pairs A, B, and in FIG. 5a these preferences have been arbitrarily set in alignment, that is, a preferred direction, $\alpha_{A_1}$, of grating pair A in this first situation is the same as a preferred direction, $\alpha_{B_1}$, of grating pair B.

In accordance with the previous description, when the dual grating pair combination is placed in a beam of omnidirectional input light of substantially uniform intensity, $I_i$, the transmitted light output from grating pair A, that is, the light intermediate the two pairs of gratings, as designated by the half-arrow, will vary in intensity, $I_\phi$, as a function of the alignment between any output direction, $\phi_0$, and the directional preferences of grating pair A. The variation in the intensity of the output light from grating pair A is thus as shown by FIG. 2, and considering, for example, the arbitrarily selected intermediate direction, $\phi_1$, it will be seen, since that direction is aligned with the preferred direction, $\alpha_{A_1}$, that light transmitted in that direction as output from pair A will be a maximum. In view of the fact that the ruling pattern of the grid elements comprises approximately 50 percent opaque, light-absorbing areas, the maximum light transmission through grating pair A, or any such grating pair, will be roughly one-half of input intensity, $I_i$. In this regard also the minimum light transmission through a pair of gratings, i.e., in non-preferred directions, may normally be about 10 percent of the input intensity due to extraneous scattering of light within a system. This representative range of intensities, i.e., between about 50 percent and 10 percent, as the maximum and minimum transmissions for a grating pair is employed in the present description, particularly for the purpose of the curves in the drawings.

Referring further to FIG. 5 (FIG. 5a), it is apparent that the light output from grating pair A is the light input to grating pair B and varies in intensity, $I_\phi$, as a function of the direction of output from pair A. Regarding the indicated intermediate direction, $\phi_1$, as input to pair B, it will be seen that since such input is aligned with a preferred direction, $\alpha_{B_1}$, of the grating pair, the intensity, $I_o$, of light output from pair B will further be a maximum, according to the curve of FIG.

4, and $I_o$ will, in part, be the product of the maximum transmissions of each grating pair in the preferred directions. Concurrently, light output from grating pair A in the non-preferred, $\beta$, directions as it comprises input to grating pair B will be further minimally transmitted by pair B, output $I_o$ further comprising the product of minimum transmissions in those directions.

Figure 6:
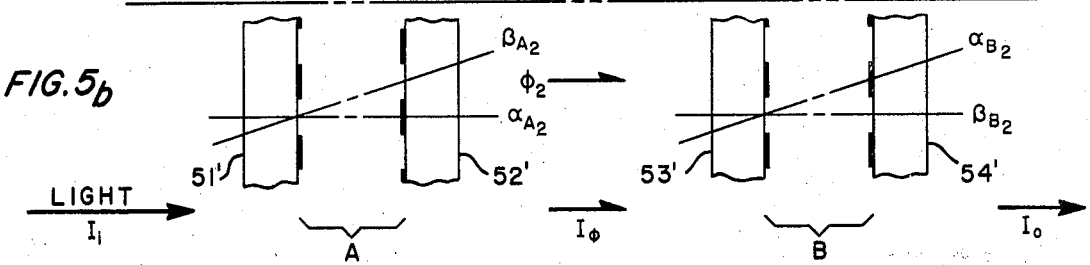
FIGS. 6 and 7 are curves representative of the intensity of light output from two pairs of amplitude gratings as a function of intermediate direction for the respective positional arrangements of FIGS. 5a and 5b.
Figure 6:
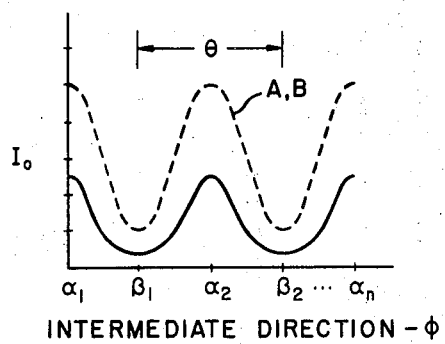

The intensity, $I_o$, of the light output from the dual grating pair combination A, B in the situation of FIG. 5a, with respect to any intermediate direction, $\phi$, will thus be the product of the intensities of light transmitted by each grating pair as a function of that intermediate direction. The resulting dual pair output intensity, $I_o$, as a function of intermediate direction, $\phi$, where preferred directions of the respective pairs are the same, can be represented by the solid line curve of FIG. 6, wherein the dotted line curve A, B represents the coincident intensity/direction curves of individual grating pairs A and B. The area beneath the product curve in FIG. 6 is representative of the output light intensity as integrated by a photocell in the output beam, the number of cycles, $\theta$, and thus the total light incident upon the photocell being determined by the dimension of the field of view of the photocell.

FIG. 5b represents a second positional situation where one grid element 53' is displaced in the transverse direction by an increment of $d/2$, thereby causing a $\theta/2$ shift of the directional preferences of grating pair B and alignment of the non-preferred directions of pair B with the unchanged preferred directions of pair A. Considering intermediate direction, $\phi_2$, it can be seen that output, $I_\phi$, from grating pair A is a maximum, $\phi_2$ being a preferred output direction, $\alpha_{A_2}$. As input to grating pair B, however, $I_\phi$, will be only minimally transmitted by pair B, since $\phi_2$ is aligned with non-preferred direction, $\beta_{B_2}$. The resulting transmission, $I_0$, will, as before, be the product of the intensities transmitted by each pair in respect of direction, $\phi_2$, but, due to the displacement noted, will be the product of respective maximum and minimum intensities.

Figure 7:
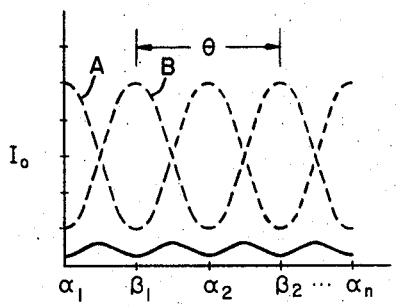

The output intensity curve of the dual grating pair arrangement of FIG. 5b appears as the product of the intensity curves A,B in FIG. 7, the area beneath the product curve being total output intensity as integrated by a photocell. A comparison of the respective integrated intensities, i.e., the areas beneath the curves of FIGS. 6 and 7, provides a representative example of the maximum and minimum limits of the magnitude of the light signal provided by an arrangement according to the present invention. It will be apparent that a displacement of greater or less than $d/2$ results in a light signal of a magnitude intermediate the represented maximum and minimum and the continuous displacement of one grating element over a plurality of grid periods, $d$, will effect a quasi-sinusoidal signal having a frequency, $\theta$.

The frequency of the cycling intensity of the light signal obtained from a system of the present invention determines the sensitivity of the system. As thus far described, such a system wherein one grid element is displaced is limited in sensitivity by the dimension of the grid period, $d$, since a displacement of one such period, $d$, is required to effect a relative shift of one period, $\theta$, in the respective directional preferences of grating pairs A,B. However, by the arrangement of grating pairs as shown in FIG. 8 it is possible to effect the simultaneous displacement of a grid element in each of the grating pairs and increase the rate at which alignment and realignment of the directional preferences of the grating pairs occurs, thus increasing the frequency of the light signal and the sensitivity of the system without a change in grid period, $d$.

Figure 8:
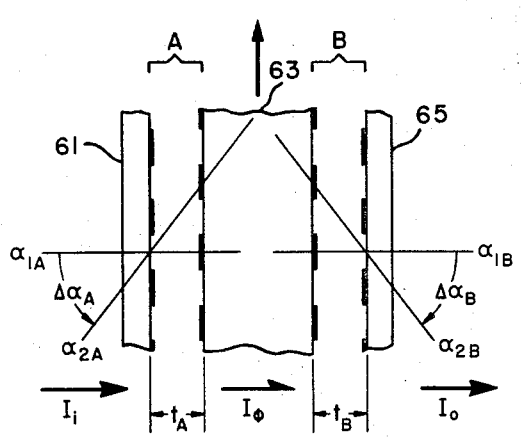
FIG. 8 is a schematic cross-sectional plan view of one embodiment of a dual grating pair arrangement according to the present invention.

The embodiment represented in FIG. 8 comprises fixed grid elements 61, 65 and a moveable element 63 situated between the fixed elements and separated from each by the optimum spacings $t_A$, $t_B$. Element 63 carries a grid pattern on each of its faces and these grid patterns form, with the respective patterns on elements 61, 65, the two grating pairs A, B characteristic of the present invention. Displacement of element 63 in the arrowed direction will be seen to effect a counter-clockwise shift, $\Delta \alpha_A$, in the directional preferences of grating pair A while simultaneously effecting a clockwise shift, $\Delta \alpha_B$, in the preferences of grating pair B. This counter-current shifting of the respective directional preferences of the two grating pairs results in a light intensity signal change frequency, $\theta$, equivalent to a displacement, $d/2$, of element 63, thereby effecting a doubling of the sensitivity of the system.

An embodiment of the invention as represented schematically in FIG. 9 provides additional advantages and is preferred for its simplicity of design. This arrangement comprises a single pair of grid elements 91, 93 of which element 93 is moveable as indicated; however, due to the fact that element 93 bears a reflecting layer 97 at the face opposite its grid pattern, the light beam is folded within the system and double-passed through the grating pair, thereby effectively establishing the two pairs of gratings characteristic of the present invention. As can be seen, the displacement of element 93 results in the countercurrent shift in the directional preferences of the grating pairs, thus achieving the noted doubling of sensitivity. An advantage inhering in this arrangement derives from the fact that one spacing, $t_{A,B}$, serves both grating pairs A,B, thereby eliminating differences in visibility of light signal which might otherwise result from an imbalance of spacings $t_A$, $t_B$ due to accidental wobble or axial movement of element 63 in the FIG. 8 arrangement. Additionally this preferred embodiment affords a more compact assembly with the light source and photocells on the same side of grid elements and allows for ready accessibility to all elements of the system.

A schematic representation of a complete system of the present invention, but for the electronic counting and display means, is shown in FIG. 10 and incorporates the more simply described dual grating pair assembly according to FIG. 8. The system comprises the grid elements 71,73,75 which form the two grating pairs; a source 72 of omnidirectional input light having a width, $W_s$; and a photocell 74 having a width $W_p$, the source and photocell being separated by a distance, D. It should be noted that the diagram of FIG. 10 is not to scale, particularly with respect to the dimensions of the grid pattern which have been greatly magnified for purposes of clarity. The effect of spacial dimensions of the system may nevertheless be considered in view of this diagram.

The field of view, $\phi_p$, of the photocell 74 is basically established by the geometry of the system in accordance with relationship, $\phi_p = \tan^{-1}(W_s + W_p)/D$. The period, $\theta$, of the directional preferences of the grating pair assembly is, as previously described, determined by the grating pair dimensions and equals $\tan^{-1} d/t$. It will thus be apparent that the number, $n$, of cycles, $\theta$, in the curve of FIG. 6 which are integrated by the photocell is $n = \phi_p/\theta$. It is, of course, recognized that, due to the effect of a light distribution function, the intensity of the light passing through the system in the region of the longitudinal axis of the system will be greater than that incident upon the photocell at the outer limits of the field, $\phi_D$; however, since in actual practice the number, $n$, of cycles integrated is relatively large, the distribution factor is of little consequence. Of more significance, however, is the fact that the effect of any distribution factor remains constant and may be disregarded entirely, since the ultimate intensity product curve indicative of the light signal varies only in amplitude and not in position.

As earlier noted, the present invention is concerned primarily with the generation of a light signal which may readily be converted to an intelligible electrical signal for use in known electronic systems and devices. Therefore, further discussion of the invention would be more appropriate with reference to a preferred embodiment.

PREFERRED EMBODIMENT

A preferred embodiment of the present invention employs the "one-sided" double-pass grating pairs arrangement schematically depicted in FIG. 9. The light signal generating assembly is shown in greater detail in plan at FIG. 11 and comprises a moveable grating element of any desired length of which a segment 113 is shown and, set in fixed position above element 113, a multi-patterned grating element 111 which will be later described in more detail. Affixed to the upper surface of element 111 are a series of photoelectric diodes 201, 202, 203, 204 and a simple shed-prism light director 118. Situated above this assembly and substantially centered with respect to element 111 is an incandescent light source (not shown). Grating element 113 comprises a plane glass plate or strip, about 5.0 mm thick and of usual optical quality, having a regular grid pattern at one face which comprises parallel lines 115 of black chrome or other opaque material separated by clear areas 117. In this embodiment each of the opaque and clear lines are about 0.008 mm wide; however, these dimensions are not critical, but were selected on the basis of ease of manufacture by common photoresist and vacuum deposit procedures. Any desired line width may be employed, bearing in mind; however, that such dimension is in part determinative of the optimum spacing, $t$, between elements 111, 113. It should also be noted that the 1:1 ratio of opaque and clear line widths here employed is not critical and, in fact, that a variance up to about 25 percent in the ratio can in some instances provide an improvement in light signal. As indicated by the double-headed arrow, element 113 is arranged for displacement in either direction transverse to the grid rulings, measurement of the extent of such displacement being the prime object of the invention.

Further detail of the present embodiment may be seen by reference to the cross-sectional view of FIG. 12. In addition to the pattern of grid lines 115 on its face, the glass plate 112 of moveable grating element 113 bears a fully reflective aluminized coating 114 over substantially the whole of its back surface. The multi-patterned grid, or reticle, element 111 comprises an optical glass plate 116 of a thickness of about 0.6 mm which has a series of grid patterns, some of which are shown at 102, 103, 121, on its face. FIG. 13 shows the entire series of grid patterns which will later be described. Cemented to the back of reticle plate 116 are silicon diode photocells, two of which are shown at 202, 203, and the light director 118. Element 118 serves merely to cant the beam of light from source 122 in the general directions of the photocells and may be of any transparent material, standard optical quality glass again being selected for the present embodiment. Light source 122 is a common incandescent tungsten lamp (G.E. 2124 D) of about 0.75 watts and provides a beam of omnidirectional light which serves as input to the dual grating pair system. The previously noted dimension, $W_s$, may be considered to be the effective width of the light beam, i.e., about 2.5 mm. In the present embodiment, part of the perimeter of the area of the interface between element 118 and the surface of plate 116 is masked by a coating of opaque black chrome (not shown) to limit stray light within the system. Other non-functional areas of the back of plate 116 may similarly be masked with the opaque coating, if desired.

The light source 122 provides, with reference to the silicon diode photocells, a wavelength range of between about 600 – 1,000 nm. An estimated average effective wavelength, $\lambda$, of 850 nm serves quite well for initially computing the optimum spacing, $t$, between grating elements 111, 113 and minor final mechanical adjustments can readily be employed to obtain the actual spacing at which signals are of desired magnitude.

As earlier indicated, it is preferred, in measuring systems of the general type which rely basically upon pulse counting, to provide four signals in phase quadrature which may be utilized in eliminating D.C. signal components as well as in distinguishing displacement direction. In the present embodiment, four such signals are generated directly as primary light signals, thus eliminating the need for beam-dividing optics or complicated electronic signal-separating systems. Such generation of four light signals is achieved in this preferred embodiment through the use of the multiple grid patterns shown in FIG. 13.

Reticle grating element 111, as indicated, bears on its face rulings of substantially the same character as described with respect to element 113. The pattern of the rulings, however, is such as to define five separate grid patterns. The first grid 121 is centrally situated across the face of plate 116 and underlies the effective interface area between element 118 and plate 116 across the width dimension, $W_s$. The transverse positioning of grid pattern 121 is selected arbitrarily. Each of the remaining grid patterns 101, 102, 103, 104 is situated in each of the quadrants of plate 116 and underlies substantially the whole of the functional area of the face of its associated photocell 201, 202, 203, 204. While each of grid patterns 101–104 has a period, $d$, which is similar to the grid periods of grating pattern 121 and that of element 113, the respective transverse position of each is displaced with respect to the next by an increment, $d/4$. For example, grid 102 lags grid 101, i.e., is displaced to the right in FIG. 13 with respect to grid 101, by one-half a line width. Similarly, grid 103 lags grid 102, etc. As will later become more apparent, each of grids 101–104 comprises one of four grating elements which constitute the dual grating pairs characteristic of the present invention, and thus the $d/4$ relative displacement of these grids effects a respective shift of $\theta/4$ in the resulting directional preferences of each of four dual grating pair systems formed with the result that the signals derived at the photocells 201–204 differ in phase by 90°.

As noted, there are established in the present embodiment four separate dual grating pair systems. The first of these comprises as the "input" pair, earlier designated as pair A, fixed grid 121 and the moveable grid of element 113. The second, or "output" pair, B, of the first system comprises the moveable grid of element 113 (due to beam reflection from coating 114) and fixed grid 101. The light intensity variations generated by this dual pair system with movement of element 113 are integrated by photocell 201 to provide a first electrical signal. The second dual pair system comprises, in light flow sequence, grids 121, 113, 113, 102 and photocell 202. The remaining two systems are similarly composed, varying in final grid and photocell elements; i.e., 103, 203 and 104, 204. With movement of element 113 each of photocells 201–204 generates the same substantially sinusoidal signal, yet these individual signals differ sequentially in phase by 90°.

Figure 14:
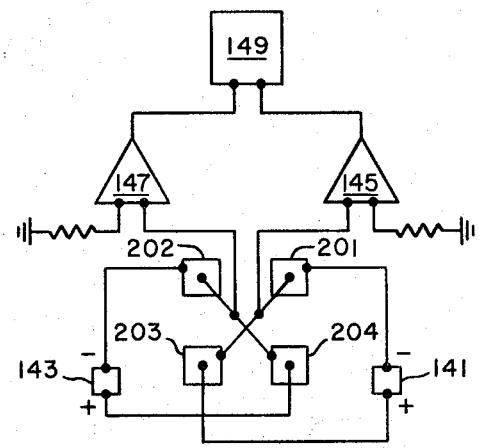
FIG. 14 is a schematic circuit diagram of an electronic system utilizing the present invention.

The signals thus derived from the photocells may be employed in the usual manner known in the art to obtain a sine-cosine signal pair which is distinctive of displacement direction as well as magnitude. A preferred electronic system is of the push-pull common-mode-elimination type and is shown schematically in FIG. 14. Photocells 201, 203 which generate signals in 180° phase opposition are connected in series to bias voltage source 141 and the resulting signal devoid of D.C. component is amplified at 145 and directed to counter 149, all according to well known procedures. The signals from photocells 202, 204 which are likewise in 180° phase opposition are similarly employed in the circuit comprising bias 143 and amplifier 147 to provide the second composite signal, 90° out of phase with the first, as input to counter means 149.

The silicon diode photocells employed in this embodiment have an effective transverse dimension, $W_p$, of about 1.6 mm, thus establishing a field of view, $\phi_p$, (FIG. 10) of about 15° for each such photocell. The effective period, $\theta$, of directional preferences for this system being about 3°, it can be seen that each photocell integrates a light signal (FIG. 6) which comprises about 5 cycles. The resulting intensity of these light signals is of such a relatively high magnitude, particularly in comparison with viewing-field-limiting systems, that the system can effectively operate on very little power as expended in the light source and amplifiers.

The described embodiment of the invention, when employed in a lineal measuring system, provides displacement discrimination to about 0.002 mm. In a comparable system employed for indicating angular displacement, as in a transit or theodolite, the moveable element 113 takes the form of a circular plate mounted for rotation upon a central axis and the rulings are radially disposed. Such a system having a grid period, $d$, of about 0.016° and having the reticle grating element 111 located at about 60 mm from the center of circle plate 113 provides angular discrimination to about 0.002°.

The foregoing embodiment has been presented for the purpose of illustration and should not be taken to limit the scope of the present invention. It will be apparent that such embodiment is capable of many variations and modifications which are likewise to be included within the scope of the present invention as set forth in the appended claims.

What is claimed is:

1. A method of creating an electrical signal varying as a function of physical displacement which comprises:
   a. arranging a light source and two pairs of amplitude grating patterns in sequence along an optical axis, the grid rulings comprising said grating patterns being substantially parallel and in parallel planes disposed substantially perpendicular to said axis, the grating patterns comprising each of said grating pattern pairs being spaced apart by a distance substantially equal to $d^2/\lambda$; where $d$ is the grating pattern period and $\lambda$ is the effective wavelength of light from said source, said spacing thereby establishing a series of directional light transmission preferences varying cyclically in a direction transverse to said grid rulings;
   b. directing a beam of substantially omnidirectional light from said source through said two pairs of grating patterns along said optical axis to incidence upon photoelectric means capable of providing an electrical signal varying as a function of the intensity of light from said source incident thereupon, said photoelectric means having a field of view with respect to said light source inclusive of a plurality of cycles in said directional light transmission preference series; and
   c. displacing at least one of said grating patterns with respect to its pair-mate grating pattern in a direction transverse to said grid rulings, thereby effecting a variation in the intensity of the light transmitted through said two pairs of grating patterns and incident upon said photoelectric means as a function of the displacement of said at least one grating pattern.

2. A method of determining incremental displacement between a pair of objects which comprises:
   a. arranging a light source and two pairs of amplitude grating patterns in sequence along an optical axis, the grid rulings comprising said grating patterns being substantially parallel and in parallel planes disposed substantially perpendicular to said axis, the grating patterns comprising each of said grating pattern pairs being spaced apart by a distance substantially equal to $d^2/\lambda$; where $d$ is the grating pattern period and $\lambda$ is the effective wavelength of light from said source, said spacing thereby establishing a series of directional light transmission preferences varying cyclically in a direction transverse to said grid rulings, at least one of said grating patterns being coupled with at least one of said pair of objects in such a manner as to effect a relative movement between said at least one grating pattern and its pair-mate grating pattern in a direction transverse to said grid rulings as a function of said incremental displacement between said pair of objects;
   b. directing a beam of substantially omnidirectional light from said source along said optical axis and through said grating pattern pairs to incidence upon photoelectric means capable of providing an electrical signal varying as a function of the intensity of light from said source incident thereupon, said photoelectric means having a field of view with respect to said light source inclusive of a plurality of cycles in said directional light transmission preference series;

c. connecting said photoelectric means as electrical signal input source in circuit with electronic means capable of indicating displacement as a function of the cycling of an electrical input signal; and d. causing said incremental displacement between said object pair and coincidentally said relative transverse movement between said pair of grating patterns; thereby effecting a cycling variation in the intensity of light transmitted by said two pairs of grating patterns and incident upon said photoelectric means, and providing said cycling electrical input signal indicative of said incremental displacement.

3. A device for providing a variation in an electrical signal as a function of physical displacement which comprises:

a. a source of substantially omnidirectional light;

b. photoelectric means capable of providing an electrical signal varying as a function of the intensity of light from said source incident thereupon, said photoelectric means being disposed with respect to said light source so as to receive said omnidirectional light therefrom along a path establishing an optical axis in said device; and c. at least two pairs of amplitude grating patterns disposed in sequence along said optical axis, the grid rulings comprising said grating patterns being substantially parallel and in parallel planes disposed substantially perpendicular to said axis, the grating patterns comprising each of said grating pattern pairs being spaced apart by a distance substantially equal to $d^2/\lambda$; where $d$ is the grating pattern period and $\lambda$ is the effective wavelength of light from said source, said spacing thereby establishing a series of directional light transmission preferences varying cyclically in a direction transverse to said grid rulings;

d. said photoelectric means having a field of view with respect to said light source inclusive of a plurality of cycles in said directional light transmission preference series;

e. at least one of said pairs of grating patterns being arranged for relative movement therebetween in a direction transverse to the grid rulings of said grating patterns, thereby to effect said physical displacement.

4. A device according to claim 3 which further comprises means whereby said optical axis is folded, and wherein said two pairs of grating patterns comprise a single pair of grating patterns which, by virtue of said axis folding, is disposed at least once in each leg of said folded axis.

5. A device according to claim 3 wherein each of said grating patterns is carried by a separate transparent support and wherein one of said supports is arranged for movement in said transverse direction.

6. A device according to claim 3 wherein said two pairs of grating patterns respectively comprise, in sequence along said optical axis, first and second grating patterns carried on separate transparent supports, and third and fourth grating patterns carried on separate transparent supports, and wherein said supports are arranged for coincident relative transverse movement in such a manner that the direction of relative movement of said first grating pattern with respect to said second grating pattern is opposite to the direction of relative movement of said third grating pattern with respect to said fourth grating pattern.

7. A device according to claim 6 wherein said first grating pattern is carried on a first support, said second and third grating patterns are carried, respectively, on opposite faces of a second support, and said fourth grating pattern is carried on a third support.

8. A device according to claim 6 which further comprises reflective means whereby said optical axis is folded, and wherein, by virtue of said axis folding, a grating pattern carried by one of a pair of said supports comprises both of said first and fourth grating patterns and a grating pattern carried by the other one of said pair of supports comprises both of said second and third grating patterns.

9. A device according to claim 6 wherein said first and fourth grating patterns are carried by a first transparent support and a separate grating pattern is carried by a second transparent support, said device further comprising means whereby said optical axis is folded and caused to double-pass said second support, said separate grating pattern thereby comprising said second and third grating patterns, at least one of said first and second supports being arranged to provide relative opposite transverse movement between said supports.

10. A displacement-indicating device comprising:

a. a source of substantially omnidirectional light;

b. photoelectric means capable of providing an electrical signal varying as a function of the intensity of light from said source incident thereupon, said photoelectric means being disposed with respect to said light source so as to receive said omnidirectional light therefrom along a path establishing an optical axis in said device;

c. a plurality of amplitude grating patterns comprising, in sequence along said optical axis:

1. a first amplitude grating pattern situated in a plane substantially perpendicular to said axis;

2. a second amplitude grating pattern situated in a plane substantially perpendicular to said axis;

3. a third amplitude grating pattern situated in a plane substantially perpendicular to said axis; and 4. a fourth amplitude grating pattern situated in a plane substantially perpendicular to said axis;

5. the grid rulings of all said grating patterns being substantially parallel as viewed along said optical axis;

6. said first and second grating patterns, and said third and fourth grating patterns, respectively, being spaced apart by a distance substantially equal to $d^2/\lambda$; where $d$ is the grating pattern period and $\lambda$ is the effective wavelength of light from said source, said spacing thereby establishing a series of directional light transmission preferences varying cyclically in a direction transverse to said grid rulings;

d. said photoelectric means having a field of view with respect to said light source inclusive of a plurality of cycles in said directional light transmission preference series;

e. at least one of said grating patterns being arranged for movement in its plane in a direction transverse to its grid rulings, thereby to effect the displacement to be indicated; and f. electronic means in circuit with said photoelectric means and responsive to electrical signals provided by said photoelectric means to provide an indication of displacement.

11. A device according to claim 10 wherein said first and fourth grating patterns are carried by a first transparent support and a separate grating pattern is carried by a second transparent support, said device further comprising means whereby said optical axis is folded and caused to double-pass said second support, said separate grating pattern thereby comprising said second and third grating patterns, at least one of said first and second supports being arranged to provide relative opposite transverse movement between said supports.

12. A device according to claim 10 wherein a plurality of said grating patterns are arranged for coincident transverse movement in such a manner as to effect relative movement of said first grating pattern with respect to said second grating pattern in a direction opposite to the relative movement of said third grating pattern with respect to said fourth grating pattern.

13. A device according to claim 12 wherein said second and said third grating patterns are carried in common by a single transparent support, and wherein said support is arranged for said transverse movement, thereby to effect said opposite directions of relative grating pattern movement.

14. A device according to claim 10 wherein said first grating pattern is carried by a first transparent support and said second grating pattern is carried by a second transparent support, and wherein said means establishing said optical axis comprises means whereby said optical axis is folded and caused to double-pass said supports, said second and first grating patterns thereby comprising, respectively, said third and fourth grating patterns, at least one of said first and second supports being arranged to provide relative opposite transverse movement between said supports.

15. A device according to claim 14 wherein said optical axis folding means comprises a reflective surface situated subsequent to said second grating pattern in said sequence along said optical axis and disposed substantially perpendicular to said axis.

16. A device according to claim 10 wherein:
a. at least one of said grating patterns comprises a plurality of regions wherein the grid rulings comprising each of said grating pattern regions are transversely displaced with respect to the grid rulings comprising each other grating pattern of said plurality of regions by a fractional increment of the period of said at least one grating pattern; and
b. said photoelectric means comprises a plurality of photocells, each of said photocells being arranged to respectively receive light transmitted by a different one of said plurality of grating pattern regions; whereby a plurality of phase-displaced electrical signals are generated by said photoelectric means in response to light transmitted through said plurality of amplitude grating patterns along said optical axis.

17. A device according to claim 16 wherein said at least one grating pattern comprises four grating pattern regions, and wherein said regions are displaced sequentially by an increment substantially equal to one-quarter of said grating pattern period, thereby providing phase-quadrature displacement in four signals generated by said photoelectric means.

* * * * *